Oct. 21, 1924.　　　　　　　　　　　　　　　1,512,755
A. GALBRAITH
POWER DRIVEN VEHICLE FOR SERVICE ON ROADS AND RAILS
Filed July 6, 1923　　　3 Sheets-Sheet 1

Inventor
A. Galbraith
by Wilkinson & Giusta
Attorneys.

Oct. 21, 1924.
A. GALBRAITH
1,512,755
POWER DRIVEN VEHICLE FOR SERVICE ON ROADS AND RAILS
Filed July 6, 1923   3 Sheets-Sheet 2
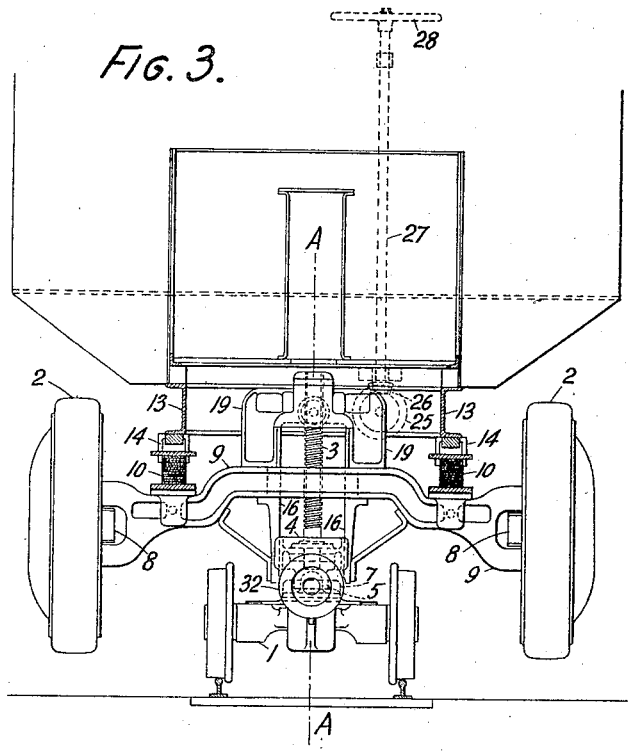
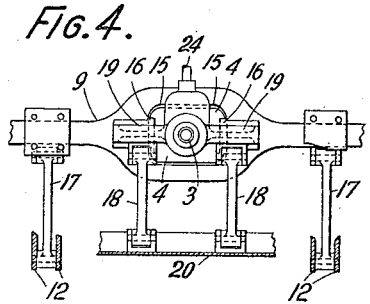
Inventor
A. Galbraith
by Wilkinson & Giusta
Attorneys.

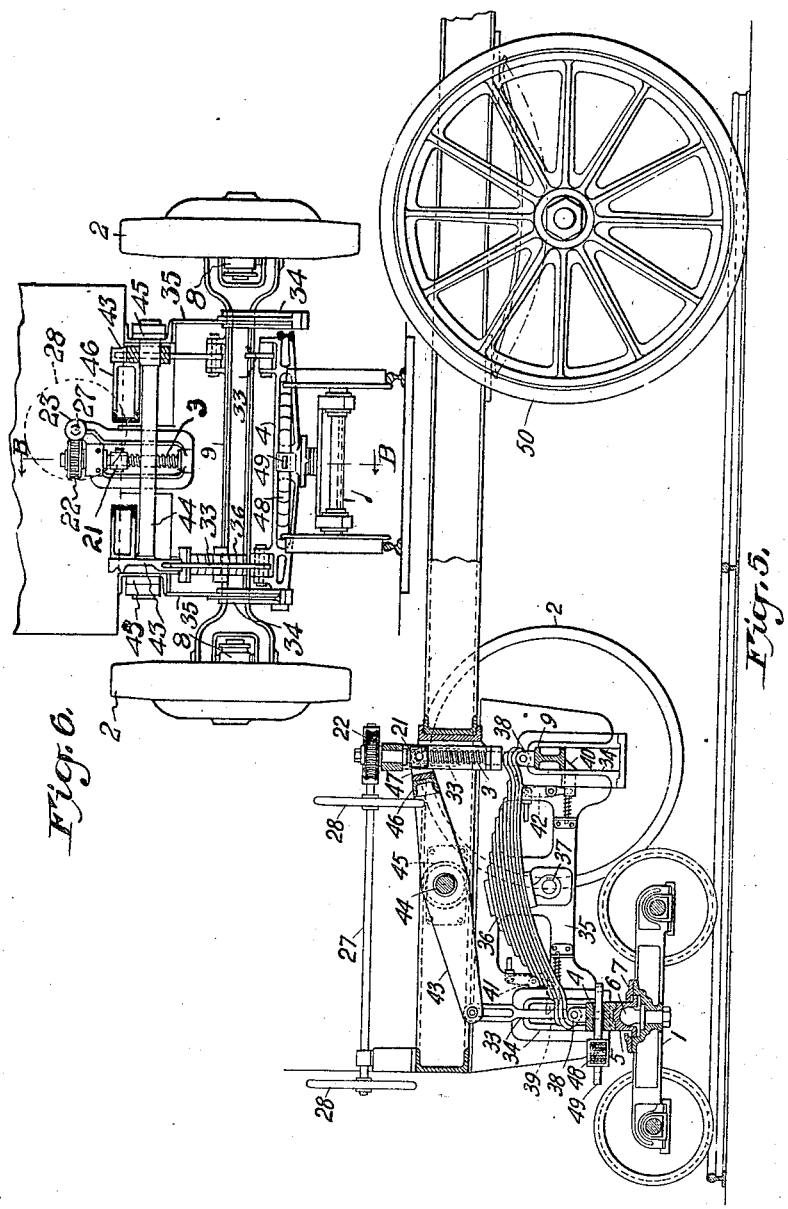

Patented Oct. 21, 1924.

1,512,755

UNITED STATES PATENT OFFICE.

ALEXANDER GALBRAITH, OF DALMUIR, SCOTLAND, ASSIGNOR TO ROADRAILS LIMITED, OF LONDON, ENGLAND, A COMPANY OF GREAT BRITAIN.

POWER-DRIVEN VEHICLE FOR SERVICE ON ROADS AND RAILS.

Application filed July 6, 1923. Serial No. 649,915.

*To all whom it may concern:*

Be it known that I, ALEXANDER GALBRAITH, a subject of the King of England, residing at "Ravenswood," Dalmuir, Dumbartonshire, Scotland, have invented certain new and useful Improvements in Power-Driven Vehicles for Service on Roads and Rails, of which the following is a specification.

This invention relates to motive power vehicles preferably for use in the haulage of loads on roads and rails, and has for its object to provide a vehicle which shall be readily convertible from either a road tractor or carrier into a rail tractor or carrier, or inversely from a rail carrier into a pure road tractor as may be required. The invention is more particularly concerned with vehicles of the lorry or tractor type having road wheels preferably rubber tyred for service on ordinary roads and adapted when required for service on roads and rails to have its substructure centrally coupled with a rail wheel unit such as a bogie for running on a rail track, in which case the driving wheels are running on the road or, if need be, on specially prepared wheel ways outside or inside the rail track, thereby enabling the vehicle to take advantage of and to combine the additional adhesive effect of the rubber tyred driving wheels on the road with the lesser tractive effort required for the haulage of vehicles on rails.

The coupling of the heavy vehicle with and its uncoupling from a detached rail bogie is a somewhat difficult and at any rate laborious operation, since for this purpose the vehicle must be run astride the rail track and usually up an incline such as a ramp to be first raised over the bogie and then lowered to effect the connection, and again raised to effect the disconnection necessitating in all cases the accomodation and use of heavy accessories and more frequently than not, also additional manual labour which is not always available.

Now the object of this invention is to obviate this defect and to enable the change over from road to rail or rail to road to be effected with the greatest ease and simplicity. This is attained by providing a road tractor with a rail wheel or rail wheels such as for example a four wheel rail bogie or like unit as a constituent part and with means whereby as may be required the said unit or rail bogie is carried by the vehicle in either an inoperative or in an operative position according to whether the vehicle is to be used for road service alone or to be run across and astride a rail track or for use simultaneously as a road and rail vehicle with the bogie in running position on the rail track. To this end mechanism is provided to enable the rail wheel unit or bogie to be raised and lowered at will, and when raised, to be held clear of the ground and rail track, and when lowered, to be effectually held also in its running position. Preferably the bogie is arranged in juxtaposition to the usual front road or steering wheels of the tractor and the gear for lifting and lowering the bogie is constructed to actuate both whereby when the rail bogie is in running position on the rails and is to be relied on for steering, the road or hand steering wheels are held clear of the road and when the rail bogie is moved to its inoperative position to clear the rails, the front road wheels of the tractor are mechanically caused to descend to the road.

Two constructional examples illustrative of the manner in which the invention may be performed will now be described with reference to the annexed drawings in which the Figures 1 to 4 show a constructional form in which the front road or steering wheels and the rail bogie are arranged centrally one to the other; Figs. 5 and 6 illustrate by way of a modification the rail bogie forward of the front road wheels.

Fig. 3 is a front elevation of the vehicle in its adaptation as a rail tractor as shown in Fig. 1.

Fig. 4 is a plan view of the road wheel axle employed in this construction and its connection to the chassis.

Fig. 5 is a side elevation partly in section on the line B—B of Fig. 6 showing the modified arrangement of a bogie forward of the front road wheels and of the conversion gear employed in this instance, and Fig. 6 is a front elevation thereof.

The same reference numerals have been used to indicate the same or equivalent parts in these constructional forms.

Figure 1:
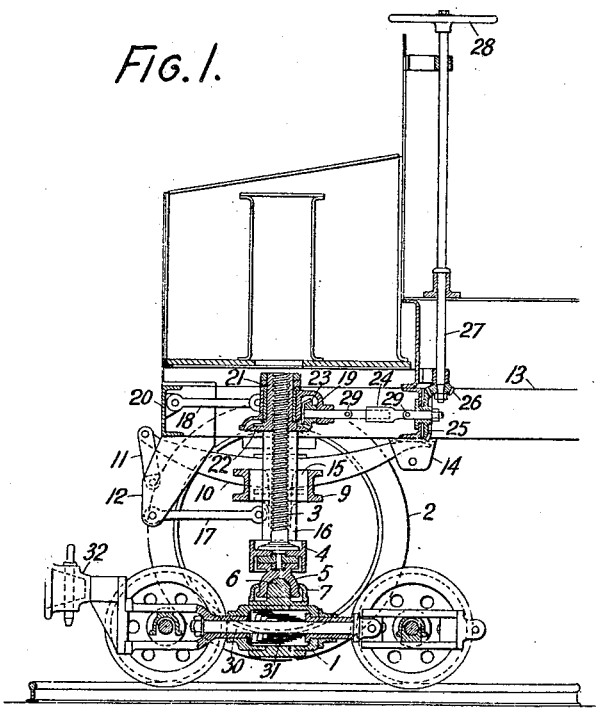
Fig. 1 is a sectional side elevation, of the front part of a tractor on the line A—A of Fig. 3 showing the vehicle ready for use as a rail carrier or tractor with the bogie in running position on the rails.

In the example shown in Figs. 1 to 4, a rail bogie 1 having four small wheels of the usual type fixed to rotating axles is arranged centrally between a pair of front road or hand steering wheels 2. It is centrally suspended from a screw spindle 3, the lower end of which is attached to a sliding shoe 4. Attached to this sliding shoe at the opposite side is a socket 5 of which the spherical cavity is adapted to receive a spherical projection 6 mounted centrally on the bogie frame and forming with the socket 5 a ball and socket joint enabling the bogie 1 and the vehicle to adapt themselves relatively to the varying conditions of the rail and road tracks. A cover plate 7 is fitted to the bogie frame so as to rise above and embrace the socket 5 and establish connection between the bogie and the screw spindle 3 by engagement with the socket 5, as will be clearly understood.

The front road wheels 2 are steered by stub axles 8 supported in the main axle 9, attached to which are the usual laminated springs 10. These springs support the vehicle at their forward ends by means of shackles 11 connected to lateral brackets or carriers 12 depending from the main longitudinal frame bearers 13 and their rear ends by sliding contact in brackets 14 likewise mounted on the said main frame parts. The front road wheel axle 9, as shown in Fig. 4 is formed with a central cavity or loop 15 laterally in which are secured vertical guides 16 by which the sliding shoe 4 is guided during its up and down movements. In order to support the road wheel axle 9 against longitudinal displacements in relation to the chassis, but to admit of vertical relative displacements thereof, it is connected to the main frame of the chassis by means of links 17 which are pivotally secured to the spring carriers 12, while links 18 connect a bridge piece 19 which is centrally mounted on the axle 9 to the front cross bearer 20 of the main chassis frame (Fig. 4). The bridge piece or yoke 19 carried by the axle tree 9 serves as a housing or bearing for a member 21 which forms the nut for the screw spindle 3. This nut is formed at its bottom with or rigidly connected to a bevel gear wheel 22 to which rotary motion may be imparted by a bevel pinion 23 mounted on a longitudinal shaft 24. This shaft carries at its other end a bevel gear wheel 25 meshing with a bevel pinion 26 at the end of a vertical shaft 27 adapted to be operated from the driver's platform by means of a hand wheel 28. Inasmuch as the bevel gear 22, 23 forms an integral part of the front axle 9 and the gear wheels 25, 26 are mounted on the chassis frame, the shaft 24 is in practice constructed with an expansible or telescoping portion arranged between two universal joints 29, only diagrammatically indicated in Figures 1 and 2. By this arrangement, the shaft 24 is able to adapt itself to the relatively varying position of the axle 9 and the chassis frame. By the provision of a further bevel pinion, such as 23, at the front end of the nut 21, in the place of or in addition to the bevel pinion 23 in its rear, the operation of the nut 21 may be performed from the front of the vehicle instead of or in addition to its being performed from the platform.

A swivelling drawbar 30 with springs 31 is provided on the bogie and is fitted at its forward end with a combined buffer and coupling 32. The construction thus described therefore provides a central lifting and lowering gear, the operation of which will be clearly understood.

Figure 2:
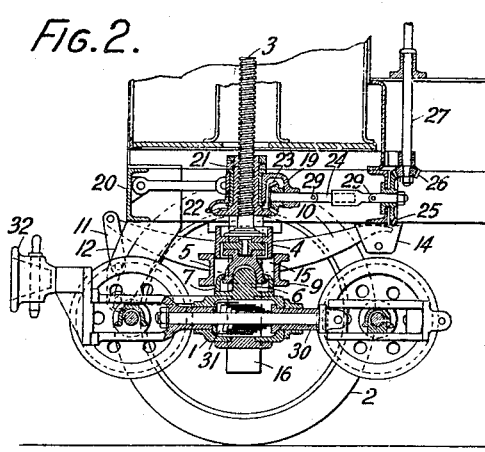
Fig. 2 is a similar view showing the vehicle converted into a road tractor or carrier with the bogie raised and the front road or steering wheels in running position on the road.

If the vehicle is in use as a road and rail tractor with the bogie 1 in running position on the rails as shown in Figs. 1 and 3, and the road driving wheels straddling the rail track in the rear thereof, and is to be converted into an ordinary road tractor as shown in Fig. 2, the nut 21 is rotated by the operation of the hand wheel 28 in clockwise direction assuming the screw spindle 3 to be provided with right hand thread. By this action the nut first commences to descend on the spindle 3, causing the yoke 19 and with it the front axle 9, together with the vehicle body supported thereon, to be lowered until the road wheels 2 repose on the road. At this moment, the road wheels 2 with the axle 9 form a rigid abutment immobilizing the nut 21 against further downward movement. Therefore continued rotation of the nut 21 will cause the screw spindle 3 to rise and by means of the sliding shoe 4 and the socket 5 and cover plate 7 to raise the bogie 1 off the rail track until the movement of the shoe 4 travelling on its guides 16 through the loop 15 in the axle 9 is arrested by the nut 21, or by its component part or bevel gear wheels 22. The rail bogie is thus safely suspended in its raised position clear of the road and rail track with the parts 5, 6 and 7 housed in the cavity 15, as clearly shown in Fig. 2.

When now it is desired to convert the vehicle again into a rail tractor or carrier, the nut 21 is operated in anti-clockwise direction whereby the screw spindle 3 is caused to descend until the bogie reposes on the rails, after which the front road axle 9, together with the wheels 2 will be caused to rise and held clear of the road.

Any suitable means may, if desired, be provided as an additional safeguard for locking the operating gear when either the rail bogie or the road wheels are in their raised position.

In the example shown in Figs. 5 and 6, the rail bogie 1 is arranged forward of the front road wheels 2 and the change over from road to rail and from rail to road is effected by a rocking gear. The road wheels 2 are again carried by an axle 9 and stub axles 8 for steering when acting as road carrier or tractor, and the bogie 1 has four rail wheels for use on the rails when the vehicle is to serve as rail tractor or carrier. The bogie 1 when on the rails supports a bogie beam or axle 4 by means of a ball and socket joint 5, 6, and when raised is supported by the bogie beam or axle through the cover plate 7. The axles 4 and 9 are adapted to be raised and lowered by links 33, and are guided in their movements by guide plates 34 attached to side plates 35. Leaf springs 36 one on each side, are rotatably attached at their centres to the side plates 35 by links 37, and have their ends pressing on rollers 38. These rollers are fitted to the axles 4 and 9 and take the load, permitting the springs to move freely under varying loads and shocks.

Self acting spring locking bolts 39, 40 are provided preferably on the side plates 35 as shown so as to secure the axles 4 and 9, when either of them is in the raised position, and to be withdrawn automatically or by hand by the actuation of levers 41, 42, or by any suitable means, when either axle is to be lowered.

The links 33 serve to connect the axles to tilting levers 43 and are slotted at their upper ends to permit, without moving the levers, the up and down movements of the bogie or road wheel axles when bumped or when moving over uneven ground.

The tilting levers 43 are mounted on a rocking shaft 44, which is carried in bearings 45, fitted to the frame work of the vehicle. A box shaped brace or channel member 46, extending between the levers and fixed thereto, carries a bracket 47 with forked ends which engage with projections on a nut 21 adapted to travel up and down on a screw spindle 3. The nut 21 when raised by its spindle, causes the road wheel axle 9 to be raised rocking the levers 43 thus permitting the forward links 33 and the bogie axle 4 to descend and at the same time tilting the springs 36, which depress the bogie axle to its running position. The road wheel axle 9 which has been raised in the same operation is then held in position by the spring locking bolt 40, supporting the road wheel ends of the springs and holding the road wheels clear of the ground. When the nut 21 is lowered the bogie axle 4 is raised lifting the bogie wheels clear of the track, while the road wheel axle 9 is caused to descend, lowering the road wheels to their running position with the leaf springs pressing down on the road wheel axle while the bogie axle 4 is locked by the spring bolt 39 which is then beneath it.

The screw spindle 3, on which the nut 21 moves is actuated by a worm wheel 22 and worm 23 which is in turn actuated by hand wheels 28 through the agency of a shaft 27.

For the use of the vehicle as a tractor, a leaf spring 48 and drawbar 49 are in this case provided on the bogie beam or axle as shown to take up the pull or push of the traction.

As already stated, the specific forms hereinbefore described should be regarded as examples only of how the invention may be carried into effect and it is obvious that constructional modifications could be readily devised by those skilled in the art, and hydraulic or other suitable mechanism could be used to effect the raising and lowering of the parts without departing from the spirit of the invention. It will further be obvious that in the place of the usual rubber tyred road driving wheels 50, shown in Fig. 5, a driving unit of the endless track type may be employed, and that without material variations either of the two first forms of the vehicle described may, if required, be provided also with a lifting and lowering rail bogie at its rear end for steering when going astern.

I claim:

1. A power driven vehicle for service on roads and rails comprising in combination a rail wheel unit such as a rail bogie, and means whereby for road service the said rail wheel unit is carried on the vehicle in a position clear of road and rail and for rail service is carried thereon in running position on a rail track as required.

2. A power driven vehicle for service on roads and rails comprising in combination a road tractor, a rail wheel unit such as a rail bogie fitted to the substructure thereof and means whereby during road service the bogie is maintained on the said substructure in an inoperative position clear of the rail track and for rail service is held on said substructure in running position on said rail track.

3. A power driven vehicle for service on roads and rails comprising in combination a rail wheel unit such as a rail bogie and means whereby as may be required the said rail bogie may be mechanically raised from and lowered to a rail track at will.

4. A power driven vehicle for service on roads and rails comprising a rail service unit such as a rail bogie in combination with a pair of road wheels and means for raising the rail bogie when the road wheels are in running position on the road and for raising the road wheels when the rail bogie is in running position on the rails.

5. A power driven vehicle for service on roads and rails comprising in combination a rail bogie, a pair of road wheels arranged in juxtaposition thereto and a lifting and lowering gear common to both whereby the action by which said rail bogie is lowered causes the road wheels to rise when the bogie has reached its running position and the action by which said road wheels are lowered causes the rail bogie to rise when the road wheels have reached their running position substantially as set forth.

6. A power driven vehicle for service on roads and rails comprising in combination a pair of road wheels and a rail bogie arranged in juxtaposition centrally one with the other and adapted to perform alternately opposite movements along a central vertical axis common to both.

7. A power driven vehicle for service on roads and rails comprising in combination a rail bogie and a pair of road steering wheels arranged centrally therewith and means whereby said rail bogie and the axle of the said road wheels are respectively connected to mechanically operated actuating members adapted by linear vertical motion to raise one and to lower the other.

8. A power driven vehicle for service on roads and rails comprising in combination a rail bogie and a pair of road wheels for steering, means for actuating said bogie and road wheels in opposite directions and means whereby the said road wheels and the rail bogie are connected to their actuating members in a yielding manner enabling said bogie and the said road wheels respectively to perform up and down movements independently of their actuating members.

9. A power driven vehicle for service on roads and rails comprising in combination a rail bogie centrally connected to a vertical screw spindle, a pair of road steering wheels arranged centrally thereto, a nut on said spindle connected to the said road steering wheels and mechanism for raising and lowering said screw spindle and for lowering and raising said nut respectively thereby alternately causing the rail bogie to rise and the road wheels to descend and vice versa, substantially as and for the purpose set forth.

10. A power driven vehicle for service on roads and rails, comprising in combination a rail bogie and a pair of road steering wheels, means for alternately raising the one and lowering the other and means whereby the said road wheels and the said bogie are elastically held in their respective running positions substantially as set forth.

In testimony whereof I affix my signature in presence of two witnesses.

ALEXANDER GALBRAITH.

Witnesses:
FRANK BLAKEY,
MAURICE ARTHUR VICTOR.